US011087151B2

(12) United States Patent
Yu et al.

(10) Patent No.: US 11,087,151 B2
(45) Date of Patent: Aug. 10, 2021

(54) AUTOMOBILE HEAD-UP DISPLAY SYSTEM AND OBSTACLE PROMPTING METHOD THEREOF

(71) Applicant: BOE TECHNOLOGY GROUP CO., LTD., Beijing (CN)

(72) Inventors: Yue Yu, Beijing (CN); Zhusong Yi, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/616,261

(22) PCT Filed: Apr. 1, 2019

(86) PCT No.: PCT/CN2019/080761
§ 371 (c)(1),
(2) Date: Nov. 22, 2019

(87) PCT Pub. No.: WO2019/192418
PCT Pub. Date: Oct. 10, 2019

(65) Prior Publication Data
US 2020/0089972 A1 Mar. 19, 2020

(30) Foreign Application Priority Data

Apr. 4, 2018 (CN) .......................... 201810299089.4

(51) Int. Cl.
*G06K 9/00* (2006.01)
*G06T 19/00* (2011.01)
(Continued)

(52) U.S. Cl.
CPC .......... *G06K 9/00805* (2013.01); *B60K 35/00* (2013.01); *B60R 1/00* (2013.01);
(Continued)

(58) Field of Classification Search
CPC .......... G06K 9/00805; B60K 2370/177; G06T 19/006
See application file for complete search history.

(56) References Cited

U.S. PATENT DOCUMENTS

2003/0095080 A1  5/2003  Colmenarez et al.
2015/0260984 A1  9/2015  Yamakawa et al.
(Continued)

FOREIGN PATENT DOCUMENTS

CN    1589456 A    3/2005
CN    102509291 A    6/2012
(Continued)

OTHER PUBLICATIONS

International Search Report of PCT/CN2019/080761 in Chinese, dated Jul. 4, 2019, with English translation.
(Continued)

*Primary Examiner* — Matthew Salvucci
(74) *Attorney, Agent, or Firm* — Collard & Roe, P.C.

(57) ABSTRACT

An automobile head up display system and an obstacle prompt method thereof are provided. The method includes: acquiring a road condition video image, identifying obstacles from the acquired image after performing an enhancement processing on the acquired image; projecting and displaying a prompt information at corresponding positions of a front windshield of the automobile according to positions of the identified obstacles in the road condition video image.

17 Claims, 5 Drawing Sheets

(51) Int. Cl.
  *B60K 35/00* (2006.01)
  *B60R 1/00* (2006.01)
  *G02B 27/01* (2006.01)
  *G06T 5/40* (2006.01)

(52) U.S. Cl.
  CPC ..... *G02B 27/0101* (2013.01); *G06K 9/00369* (2013.01); *G06T 5/40* (2013.01); *G06T 19/006* (2013.01); *B60K 2370/1529* (2019.05); *B60K 2370/177* (2019.05); *B60K 2370/178* (2019.05); *B60R 2300/205* (2013.01); *B60R 2300/307* (2013.01); *B60R 2300/8053* (2013.01); *B60R 2300/8093* (2013.01); *G02B 2027/0138* (2013.01); *G06K 2209/23* (2013.01); *G06T 2207/10016* (2013.01); *G06T 2207/20084* (2013.01); *G06T 2207/30261* (2013.01)

(56) References Cited

U.S. PATENT DOCUMENTS

2018/0017791 A1\* 1/2018 Beckman ............... G06F 3/013
2020/0089972 A1 3/2020 Yu et al.

FOREIGN PATENT DOCUMENTS

| | | |
|---|---|---|
| CN | 105857180 A | 8/2016 |
| CN | 108515909 A | 9/2018 |
| WO | 2014/054378 A1 | 4/2014 |

OTHER PUBLICATIONS

Chinese Office Action in Chinese Application No. 201810299089.4, dated Apr. 3, 2020 with English translation.

\* cited by examiner

AUTOMOBILE HEAD-UP DISPLAY SYSTEM AND OBSTACLE PROMPTING METHOD THEREOF

CROSS REFERENCE TO RELATED APPLICATIONS

This application is the National Stage of PCT/CN2019/080761 filed on Apr. 1, 2019, which claims priority under 35 U.S.C. 0.5119 of Chinese Application No. 201810299089.4 filed on Apr. 4, 2018, the disclosure of which is incorporated by reference.

TECHNICAL FIELD

The present disclosure relates to an automobile head up display system and an obstacle prompt method thereof.

BACKGROUND

A Head Up Display (HUD), also known as the head-up display system, can map important information to a holographic half-mirror on a windshield so that a driver can see important information without looking down. HUD was firstly used as a head up display technology for aircrafts. In recent years, with the development of vehicle-assisted driving technology, the HUD technology is applied and configured in an automobile.

SUMMARY

The present disclosure provides an obstacle prompt method of an automobile head up display system, comprising: acquiring a road condition video image; identifying obstacles from the acquired image after performing an enhancement processing on the acquired image; and projecting and displaying a prompt information at corresponding positions of a front windshield of the automobile according to positions of the identified obstacles in the road condition video image.

For example, the enhancement processing on the acquired road condition video image comprises: performing a grayscale processing on the acquired road condition video image to obtain a grayscale image, and calculating a variance of grayscales of pixels of the grayscale image; and performing the image enhancement processing on the grayscale image if the variance is less than a given threshold.

For example, the performing the enhancement processing on the acquired image comprises: after receiving an instruction of opening an obstacle prompt mode, performing the grayscale processing on the acquired road condition video image to obtain the grayscale image, then performing the enhancement processing on the grayscale image.

For example, the projecting and displaying the prompt information at the corresponding positions of the front windshield of the automobile according to the positions of the identified obstacles in the road condition video image comprises: framing the obstacles with identification frames in the enhancement processed image; converting position and size information of the identification frames in a coordinate system of the enhancement processed image into the corresponding position and size information in a coordinate system of a display screen of the automobile head up display system; displaying prompt boxes as the prompt information on the display screen according to the converted position and size information; and projecting and displaying a display picture displayed by the display screen on the front windshield of the automobile by optical refraction.

For example, the projecting and displaying the prompt information at the corresponding positions of the front windshield of the automobile according to the positions of the identified obstacles in the road condition video image comprises: framing the obstacles with the identification frames in the enhancement processed image; and projecting the identification frames on the front windshield as prompt boxes for the prompt information.

For example, the obstacles comprise at least one of vehicles and pedestrians.

For example, the performing the image enhancement processing on the grayscale image comprises: performing the image enhancement processing by a histogram equalization method with sub-blocks partially overlapped.

For example, the identifying the obstacles comprise: using a convolutional neural network algorithm on the enhancement processed image to identify the obstacles from the enhancement processed image.

Another embodiment of the present disclosure provides an automobile head up display system, comprising: a road condition information collection part configured to acquire a road condition video image; a road condition information processing part connected with the road condition information collection part; and an optical projection part. The road condition information processing part is configured to perform an enhancement processing on the road condition video image acquired by the road condition information collection part and identify obstacles therefrom; and to project and display a prompt information at corresponding positions of a front windshield of the automobile through the optical projection part according to positions of the identified obstacles in the road condition video image.

For example, the optical projection part is connected with the road condition information processing part, and is configured to project the prompt information corresponding to the enhancement processed image on the front windshield.

For example, the automobile head up display system further comprises: a light source display part connected with the road condition information processing part. The light source display part is configured to display the enhancement processed image, and to project the prompt information corresponding to the image on the front windshield by the optical projection part.

For example, the road condition information processing part comprises: an image enhancement unit configured to perform the enhancement processing on the road condition video image acquired by the road condition information collection part; an identification unit connected with the image enhancement unit, and configured to identify the obstacles from the enhancement processed image; and a prompt unit connected with the identification unit, and configured to project and display the prompt information at the corresponding positions of the front windshield of the automobile according to the positions of the identified obstacles in the road condition video image by the optical projection part.

For example, the road condition information processing part further comprises: a grayscale variance calculation unit connected with the road condition information collection part and the image enhancement part, and configured to calculate a variance of grayscales of pixels for the acquired road condition video image; and after determining that the variance is less than a given threshold, transmitting an image enhancement indication information to the image enhancement unit. The image enhancement unit is configured to perform the enhancement processing on the road condition video image acquired by the road condition information collection part according to the received image enhancement indication information.

For example, the road condition information processing part further comprises: an instruction receiving unit connected with the image enhancement unit, and configured to transmit the image enhanced indication information to the image enhancement unit after receiving an instruction of opening the obstacle prompt mode. The image enhancement unit is configured to perform the enhancement processing on the image acquired by the road condition information collection part according to the received image enhancement indication information.

DETAILED DESCRIPTION

In order to make objects, technical details and advantages of the embodiments of the invention apparent, the technical schemes of the embodiments will be described in a clearly and fully understandable way in connection with the drawings related to the embodiments of the invention. It is apparent that the described embodiments are just a part but not all of the embodiments of the present disclosure. Based on the described embodiments herein, one of ordinary skill in the art can obtain other embodiment(s), without any creative work, which shall be within the scope of the present disclosure.

Unless otherwise defined, all the technical and scientific terms used herein have the same meanings as commonly understood by one of ordinary skill in the art to which the present invention belongs. The terms, such as "first," "second," or the like, which are used in the description and the claims of the present disclosure, are not intended to indicate any sequence, amount or importance, but for distinguishing various components. The terms, such as "comprise/comprising," "include/including," or the like are intended to specify that the elements or the objects stated before these terms encompass the elements or the objects and equivalents thereof listed after these terms, but not preclude other elements or objects. The terms, "on," "under," "left," "right" or the like are only used to indicate relative position relationship.

A head up display (HUD) technology displays road condition information on a display screen of a liquid crystal display (LCD) with a light emitting diode (LED) as a backplate. The HUD technology uses the display as a light source, and uses an optical device to project information displayed by the light source onto a front windshield by a series of optical operations, and the information displayed by the light source is reflected by the front windshield to the human eyes, to make the driver feel the traffic information just floats above the front hood. The road condition information may include a turning prompt and the distance to a destination.

Another HUD technology enables the combination of virtual and reality, combining virtual road condition information with real road conditions. For example, let the driver feel "protective barriers" erected on edges of the road on both sides of the real road. The "protective barriers" are actually the result of image processing after recording the actual road condition ahead.

The above HUD technology can display road condition information and even realize the combination of virtual and reality. However, inventors of the present disclosure have found when the existing HUD technology is applied in a weather condition of low visibility, such as a haze day, virtual road condition information may reduce the driver's recognition of the actual road condition of the haze day. In the haze weather, obstacles, such as vehicles or pedestrians, in front are important road conditions. If the driver cannot clearly identify them, it is easy to cause a traffic accident.

After acquiring the road condition video image by a camera of an automobile head up display system, the present disclosure enhances the acquired image to identify the obstacles from the acquired image; according to positions of the identified obstacles in the image, the prompt information is projected and displayed at the corresponding positions of the front windshield of the automobile.

In a weather condition of low visibility, such as a haze weather, the edges of the obstacles, such as vehicles or pedestrians, in the road condition video image are blurred, and the resolution is low. If the obstacles are directly identified, the identification accuracy cannot be guaranteed. After the technical scheme of the present disclosure performs image enhancement processing on the video image, the outlines of the obstacles, such as vehicles or pedestrians, are much clear, and contrast between the above obstacles and surroundings is stronger. On this basis, the identification accuracy of the obstacles, such as vehicles or pedestrians, will be greatly increased.

The automobile head up display system in the embodiment of the present disclosure can improve the identification rate of the obstacles, such as vehicles or pedestrians, in a weather of low visibility, and then the prompt information is projected and displayed at the corresponding positions of the front windshield of the automobile to prompt the driver to pay attention to the obstacles, such as vehicles or pedestrians, at the corresponding positions, and to better provide the driver with clear information of the obstacles, such as vehicles or pedestrians. In this way, the driver's recognition of the real road condition in a haze whether and the driving safety are improved.

The automobile head up display system and the obstacle prompt method thereof provided by the technical scheme of the present disclosure are described in detail below with reference to the accompanying drawings.

Figure 1:
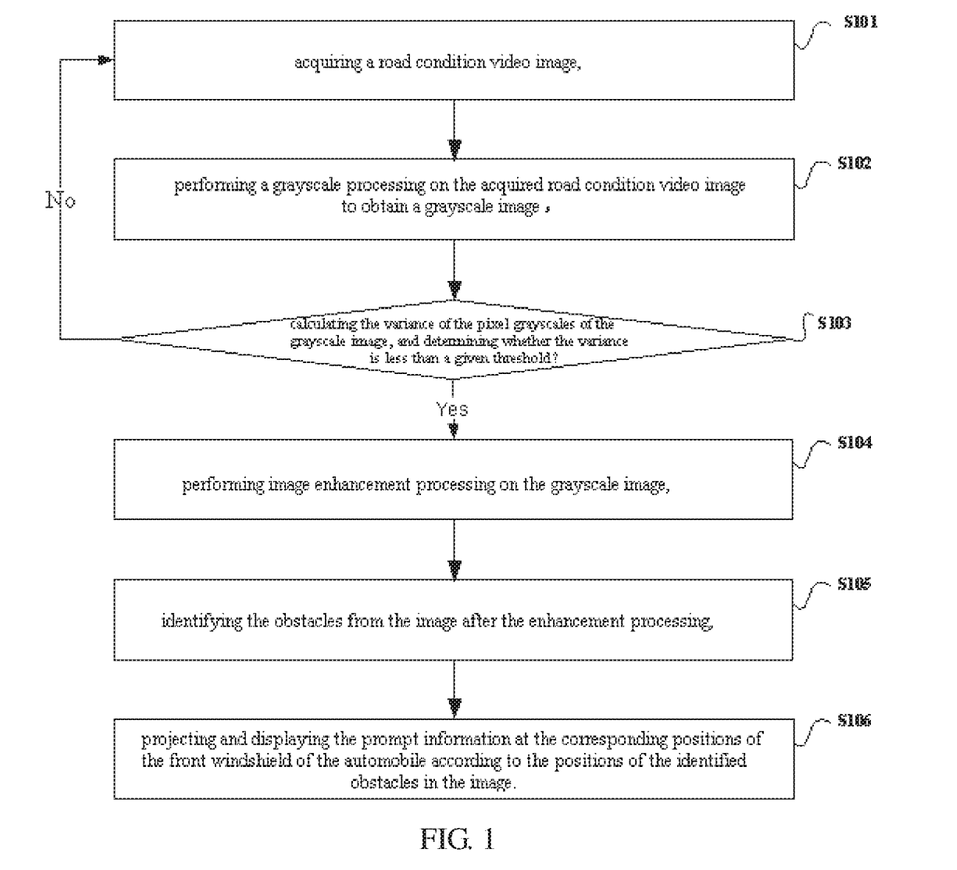
FIG. 1 is a flow chart of an obstacle prompt method of an automobile head up display system according to an embodiment of the present disclosure.

At least one embodiment of the present disclosure provides an obstacle prompt method of an automobile head up display system. FIG. 1 is a specific flow of an obstacle prompt method of an automobile head up display system according to an embodiment of the present disclosure. As shown in FIG. 1, the specific process includes the following steps.

Step S101: acquiring a road condition video image.

For example, the automobile head up display system can acquire a road condition video image of a current road condition in real time by a camera. For example, a shooting angle of the camera is the same as an angle of view of the automobile driver, and the heights are the same, so that the road condition video image captured by the camera is similar to the image view visually observed by the driver through a front windshield.

For example, the camera can be placed in the seat of the driver.

For example, setting a shooting direction of the camera to be consistent with the sight of the driver while driving can ensure that the field of view of the video image collected by the camera matches the field of view of the driver, so as to combine the actual road condition information with the virtual road condition information.

For example, while collecting the video image of the road condition, the automobile provided with the automobile head up display system can acquire current driving parameters of the automobile, such as a speed and an oil amount, by using sensors provided thereon.

Step S102: performing a grayscale processing on the acquired road condition video image to obtain a grayscale image.

For example, the automobile head up display system can perform the grayscale processing on the road condition video image acquired by the current shooting. Each color component of the color image needs to be allocated one byte storage, and the amount of calculation of processing is large, so, the grayscale processing on the acquired color road condition video image can be performed in the embodiment of the present disclosure to decrease the amount of calculation when the image enhancement is performed subsequently.

For color images (such as color images including the three primary colors of red, green, and blue), the grayscale formula is as follows: Gray=R*0.3+G*0.59+B*0.11, where Gray is the gray value of the pixel of the grayscale image obtained by the grayscale processing, and R, G and B are the color values of the pixels of the color image before the grayscale processing.

Step S103: calculating the variance of the pixel grayscales of the grayscale image, and determining whether the variance is less than a given threshold.

If yes, proceed to step S104; otherwise, go to step S101 to continue acquiring the subsequently captured road condition video images.

For example, the automobile head up display system can calculate the variance of the pixel grayscales of the grayscale image described above; If the calculated variance is less than the given threshold, the grayscales of the image tend to be consistent, indicating that the visibility of the currently captured road condition is not good. At this time, the automobile head up display system can automatically open the obstacle prompt mode, and then perform image enhancement processing on the grayscale images, that is, performing the following step S104 to perform image enhancement.

If the calculated variance is greater than the given threshold, the grayscale contrast of the image is large, indicating that the visibility of the captured road condition is good, the identification is good, and the obstacle prompt mode is not open, so as to avoid unnecessary interference to the driver's visual.

Step S104: performing image enhancement processing on the grayscale image.

For example, the automobile head up display system performs image enhancement processing on the grayscale image described above to obtain an enhanced image. For example, in a weather of low visibility, such as the haze weather, the edges of the obstacles, such as vehicles or pedestrians, in the road condition video image are blurred, and the resolution is low, identifying the obstacles directly does not guarantee the correct rate of identification, but may mislead a judgment of the driver. However, after the technical scheme of the present disclosure performs image enhancement processing on the road condition video image, the outlines of the obstacles, such as vehicles or pedestrians, are much clear, and contrast between the above obstacles and surroundings is stronger. On this basis, the identification accuracy of the obstacles, such as vehicles or pedestrians, will greatly be increased.

For example, in the technical scheme of the present disclosure, the image enhancement can be performed by using a sub-block partially overlapped histogram equalization method. The sub-block partially overlapped histogram equalization method will be described in detail later. Compared with other local histogram equalization method, this method decreases the amount of calculation while ensuring the grayscale image enhancement capability, and can improve the real time performance of the system, and is suitable to be configured to process the real time road condition video images.

For example, the local histogram equalization algorithm is also called a sub-block histogram equalization algorithm. According to an overlapping extent of the equalized sub-blocks, the algorithm can be divided into three kinds in which sub-blocks are not overlapped, sub-blocks are overlapped and sub-blocks are partially overlapped. The equalization algorithm in which the sub-blocks are not overlapped refers to dividing the input image into a series of non-overlapping sub-blocks and performing independent histogram equalization for each sub-block. The advantage of this algorithm is that the image local detail contrast can be fully enhanced. The disadvantage of this algorithm is that the histogram equalization function of each sub-block is quite different, and it is difficult to avoid blocking effect in the output image. The equalization algorithm in which the sub-blocks are overlapped refers to defining a rectangular sub-block on the input image, equalizing the pixels in the center of the sub-block using the histogram information of the sub-block image, moving the center of the sub-block pixel by pixel and repeating the above processing steps until traversing all pixels of the input image (the method is analogous to the Niblack binarization process). This method not only provides sufficient contrast enhancement of the local details of the image, but also eliminates the blocking effect. However, in this method, since the total number of sub-block equalizations is equal to the total number of the pixels of the input image, the algorithm is low efficient. The equalization algorithm in which the sub-blocks are partially overlapped is different from the equalization algorithm in which the sub-blocks are overlapped in that the sub-blocks are not moving pixel by pixel, but the moving step is about a fraction of the sub-block size; The sub-block equalized grayscale conversion function is configured not only to map the gray value of the center pixel of the sub-blocks, but also to map the gray values of all pixels of the sub-blocks; For a pixel being equalized by a several times, the equalization result is averaged as the gray value of the pixel in the output image.

Step S105: identifying the obstacles from the image after the enhancement processing.

For example, the automobile head up display system identifies the obstacle(s) from the enhancement processed image(s).

For example, the algorithm that is configured to identify the obstacles, such as vehicles or pedestrians, may include a convolutional neural network algorithm, an iterative algorithm (such as adaboost), and the like.

The convolutional neural network is a multi-layer neural network that excels in processing images, especially related machine learning problems of large images. Through a series of methods, the convolutional neural network successfully decreases dimensionality of the image identification problem with a large amount of data, and finally enables it to be trained. For example, a typical convolutional network includes a convolutional layer, a pooling layer, and a fully connection layer. The convolutional layer cooperates with the pooling layer to form multiple convolution groups, extracting features layer by layer, and finally accomplishing classification through several fully connection layers. The operation done by the convolutional layer can be considered to be inspired by the concept of local perception, and the pooling layer is mainly to decrease the data dimensionality. In this way, the convolutional neural network simulates feature differentiation by the convolution, and decreases the order of the network parameters by convolving weight sharing of the convolution and pooling, and finally accomplishes classification and other tasks by the traditional neural network.

For example, the method of identifying the obstacles, such as vehicles or pedestrians, in the image(s) by using the convolutional neural network algorithm of the embodiment of the present disclosure can include: selecting a plurality of positive samples of various angles of the vehicles and pedestrians or other obstacles from the Internet and a plurality of fuzzy negative samples of other obstacles without vehicles or pedestrians, training and verifying the convolutional neural network, obtaining a classifier for the various obstacles, such as vehicles and pedestrians, and identifying the corresponding obstacles from the image(s) by the classifier.

Step S106: projecting and displaying the prompt information at the corresponding positions of the front windshield of the automobile according to the positions of the identified obstacles in the image.

For example, according to the positions of the identified obstacles in the image, the prompt information is projected and displayed at the corresponding positions of the front windshield of the automobile by the automobile head up display system. For example, after the automobile head up display system identifies the obstacles with the classifier according to the positions of the identified obstacles in the image, the obstacles are framed by identification frames in the enhancement processed image. Further, converting position and size information of the identification frames in the coordinate system of the enhancement processed image into the corresponding position and size information in a coordinate system of the display screen of the automobile head up display system. The automobile head up display system draws the prompt boxes as the prompt information in the display picture according to the converted position and size information, displays the display picture by the display screen, and projects and displays the display picture on the front windshield of the automobile by optical refraction.

For example, the identification frames may be colored rectangular frames, and the position and size information of the identification frames in the coordinate system of the image can include coordinates of the centers of the rectangular frames in the coordinate system and length and width information of the rectangular frames.

In this way, it is possible to project and display the prompt information at the corresponding positions on the front windshield, such as projecting and displaying the prompt boxes. The positions of the prompt information just correspond to the positions of the obstacles observed by the driver through the front windshield, so that the prompt information displayed on the front windshield is presented visually. For example, virtual images of the prompt boxes frame real images of the obstacles in front (such as vehicles or pedestrians), which prompts the driver where the obstacles objects are located in front. In this way, when the visibility is low, the driver can be better provided with clear information of the obstacles, such as vehicles or pedestrians, improving the driver's recognition of the actual road conditions in haze weather and improving driving safety.

For example, the display screen can also display driving information of the vehicle, such as vehicle speed and oil amount, and project and display the driving information onto the front windshield of the automobile by optical refraction.

For example, the automobile head up display system can also frame the obstacles with the identification frames in the enhanced image, and then project the identification frames to the front windshield as the prompt boxes for prompting information. In an example of an embodiment of the present disclosure, the position and size information of the identification frames in the coordinate system of the enhancement processed image can be converted into the corresponding position and size information in the coordinate system of the display screen, and according to the converted position and size information, after the prompt boxes as the prompt information is drawn on the display screen, the step of displaying the display screen by the display screen is omitted, and the identification frames as the prompt boxes of the prompt information are directly projected to the front windshield of the automobile.

Figure 2:
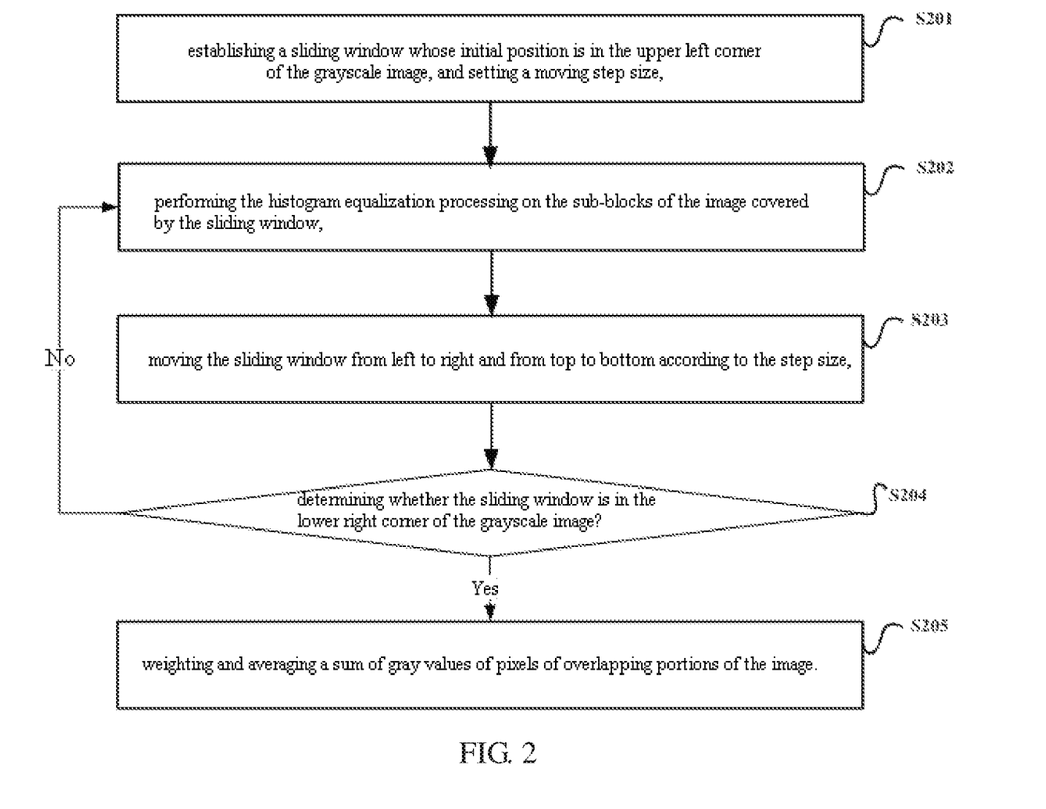
FIG. 2 is a flow chart of a sub-block partially overlapped histogram equalization method used in an embodiment of the present disclosure.

The specific process of the histogram equalization method in which the sub-blocks are partially overlapped mentioned in the above step S104 is shown in FIG. 2, and includes the following steps.

Step S201: establishing a sliding window whose initial position is in the upper left corner of the grayscale image, and setting a moving step size.

For example, a sliding window of m*n and step sizes a and b in the horizontal direction and the vertical direction can be specified firstly, where m and n are positive integers.

For example, in the embodiment of the present disclosure, a window of 32*32 is selected, and the step sizes in the horizontal and vertical directions are both set to be 4, and the initial position of the sliding window is set at the upper left corner of the grayscale image.

Step S202: performing the histogram equalization processing on the sub-blocks of the image covered by the sliding window.

For example, performing the histogram equalization processing on the sub-blocks of the image currently covered by the sliding window. For example, the image is digitized and the gray level of the image is normalized, then the gray level is quantized, and the distribution of grayscales of the image is described according to the probability density function. The probability density function is as follows:

$$p_k(r_k) = n_k/N;$$

where $r_k$ represents the kth gray level, k=0, 1, 2 ... n−1, $n_k$ represents a count of pixels of the kth gray level, and N represents a count of the pixels of the entire image, $p_k(r_k)$ represents the probability of occurrence of the pixels of the kth gray level, and n represents a level number of gray levels.

The gray values are then reassigned to each gray level by a cumulative distribution function:

$$s_k = \left[\sum_{i=0}^{k} P_r(r_k)\right] * 255;$$

where $S_k$ is a gray value after the kth gray level is equalized. The pixels of the sub-blocks images are equalized by the histogram to obtain a new gray value.

Step S203: moving the sliding window from left to right and from top to bottom according to the step size.

Step S204: determining whether the sliding window is in the lower right corner of the grayscale image.

If yes, the image processing is completed, and step S205 is performed; otherwise, the process goes to step S202 to continue the histogram equalization processing.

Step S205: weighting and averaging a sum of gray values of pixels of overlapping portions of the image.

For example, the gray values of the pixels of the overlapping portions of the adjacent sliding windows are weighted and averaged, and finally the enhancement processed road condition video image is obtained.

Figure 3A:
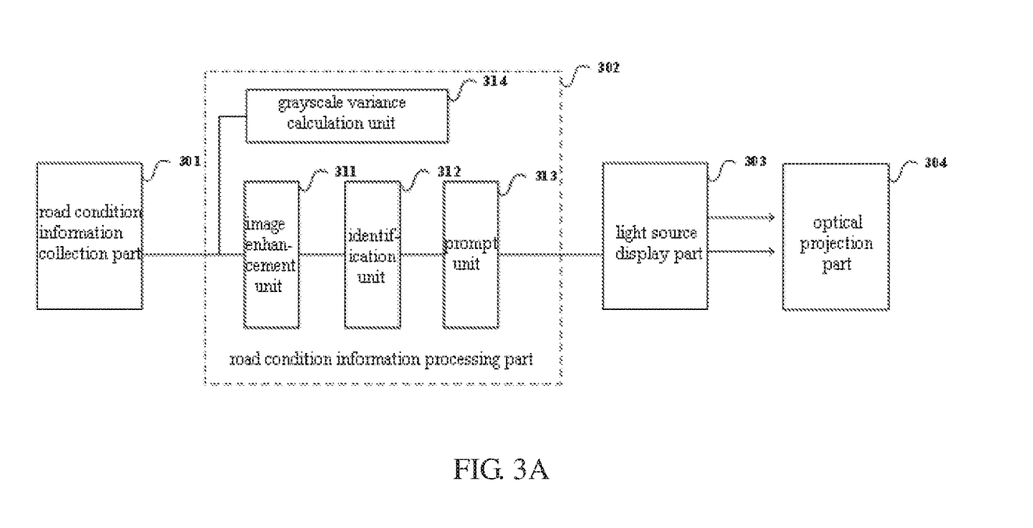
FIG. 3A is a block diagram illustrating an internal structure of an automobile head up display system according to an example of another embodiment of the present disclosure.

An example of another embodiment of the present disclosure provides an automobile head up display system, and FIG. 3A is a schematic block diagram of the automobile head up display system. As shown in FIG. 3A, the automobile head up display system includes a road condition information collection part 301, a mad condition information processing part 302, a light source display part 303, and an optical projection part 304.

As shown in FIG. 3A, the road condition information collection part 301 is connected with the road condition information processing part 302, and is configured to acquire a road condition video image.

For example, the road condition information collection part 301 can capture a road condition video image by a camera. For example, a shooting angle of the camera is the same as an angle of view of the automobile driver, and heights are the same.

For example, the camera can be placed in a seat of the driver.

For example, setting a shooting direction of the camera to be consistent with sight of the driver while driving can ensure that the field of view of the video image collected by the camera matches the field of view of the driver, so as to combine the actual road condition information with the virtual road condition information.

For example, while collecting the video image of the road conditions, the automobile provided with the automobile head up display system can acquire current driving parameters of the automobile, such as a speed and an oil amount, by using a sensor provided in the automobile head up display system.

As shown in FIG. 3A, the road condition information processing part 302 is connected with the light source display part 303, and is configured to perform an enhancement processing on the road condition video image acquired by the road condition information collection part 301, and then identify the obstacles therefrom; according to positions of the identified obstacles in the road condition video image, the light source display part 303 and the optical projection part 304 project and display prompt information at the corresponding positions of the front windshield of the automobile.

For example, the road condition information processing part 302 performs the enhancement processing on the road condition video image acquired by the road condition information collection part 301, and identifies the obstacles therefrom. For example, the road condition information processing part 302 can frame the obstacles with identification frames in the enhancement processed image; and converts position and size information of the identification frames in the coordinate system of the enhancement processed image into the corresponding position and size information in a coordinate system of the display screen of the automobile head up display system; and displays the prompt boxes as the prompt information on the display screen according to the converted position and size information, and transmit a display picture to the light source display part 303; after displayed by the light source display part 303 on the display screen, the display picture is projected and displayed on the front windshield of the automobile by the optical refraction of the optical projection portion.

For example, the light source display part 303 can include an LCD or an LED display screen, and a related driving circuit, and the displayed content thereof can further include driving information of the vehicle, such as a vehicle speed, an oil amount, and the like. In order to achieve a better virtual and realistic fusion effect, a size of a display region of the display screen can be proportional to a size of a region of road condition scene that the driver sees through the eyes.

For example, the road condition information processing part 302 converts the information of the identification frames converted in accordance with a certain proportional relationship and the driving information of the vehicle and the like into a video graphics array (VGA) signal, and transmits it to the light source display part 303 to display the corresponding road condition information at an appropriate positions.

For example, the size of the display region of the light source display part 303 should be proportional to the size of the region of the road condition scene viewed by the driver, and the positions of the identification frames corresponding to the prompt box in the display picture and the positions of the obstacles in the road condition scene viewed by the driver are consistent. In this way, the camera can be placed at a position of a main driver's seat and at a height same as the height of the eyes of the driver, and the camera direction is consistent with the sight of the driver when driving to ensure that the video image on the display screen is substantially consistent with the visual field image of the eyes of the driver.

For example, as shown in FIG. 3A, the image displayed by the light source display part 303 is propagated to the optical projection part 304.

For example, the optical projection part 304 can include a spherical mirror and a cylindrical mirror. The optical projection part 304 is configured to transmit display contents on the display screen of the light source display part 303 to the front windshield by refraction; and then the display contents are transmitted to the eyes of the driver by reflection of the front windshield to complete the fusion of the virtual scene and the real scene. The size and center position of the reflection region of the front windshield can be adjusted to a position coincident with the field of view of the eyes of the driver by adjusting a position and an angle of the mirror, adjusting an angle of reflection of the light source, and adjusting a magnification factor of the light source in initial stage.

For example, the road condition information processing part 302 can include the following units: an image enhancement unit 311, an identification unit 312, and a prompt unit 313.

The image enhancement unit 311 is configured to perform enhancement processing on the image acquired by the road condition information collection part. The method of performing the enhancement processing by the image enhancement unit 311 can refer to the above step S104, and details are not described herein again.

The identification unit 312 is configured to identify the obstacles from the image enhanced by the image enhancement unit 311. The specific method of identifying the obstacles by the identification unit 312 can refer to the above step S105, and details are not repeated herein again.

The prompt unit 313 is configured to project and display the prompt information at the corresponding positions of the front windshield of the automobile by the light source display part 303 and the optical projection part according to the positions of the obstacles identified by the identification unit 312 in the image. For example, the prompt unit 313 frames the obstacles with the identification frames in the image after the enhancement processing according to the positions of the obstacles in the image; and converts position and size information of the identification frames in the coordinate system of the image into the corresponding position and size information in the coordinate system of the display screen of the automobile head up display system; and draws the prompt boxes as the prompt information on the display screen according to the converted position and size information, and transmit the display picture to the light source display part 303; after displayed by the light source display part 303 on the display screen, the display picture is projected and displayed on the front windshield of the automobile by the optical refraction of the optical projection portion.

Further, the road condition information processing part 302 can further include a grayscale variance calculation unit 314.

The grayscale variance calculation unit 314 is configured to calculate a variance of grayscales of the pixels for the acquired road condition video image; after determining that the variance is less than a given threshold, the image enhancement indication information is transmitted to the image enhancement unit.

Accordingly, the image enhancement unit 311 is specifically configured to perform enhancement processing on the image acquired by the road condition information collection part after receiving the image enhancement indication information.

In an embodiment of the present disclosure, after acquiring the road condition video image by the camera of the automobile head up display system, enhancement processing is performed on the acquired image to identify the obstacles from the acquired image; According to positions of the identified obstacles in the image, the prompt information is projected and displayed at the corresponding positions of the front windshield of the automobile. In a weather of low visibility, such as the haze weather, the edges of the obstacles, such as vehicles or pedestrians, in the road condition video image are blurred, and the resolution is low.

If the obstacles are directly identified, the identification accuracy cannot be guaranteed. However, in the embodiment of the present disclosure, after image enhancement processing is performed on the video image, the outlines of the obstacles, such as vehicles or pedestrians, are much clear, and contrast between the above obstacles and surroundings is stronger. On this basis, the identification accuracy to the obstacles, such as vehicles or pedestrians, will be greatly increased. Projecting and displaying the prompt information at the corresponding positions of the front windshield, such as projecting and displaying the prompt boxes, when the visibility is low, the driver can be better provided with clear information of the obstacles, such as vehicles or pedestrians. In this way, the driver's recognition of the actual road condition in the haze weather is increased and the driving safety improved.

Further, in the embodiment of the present disclosure, by calculating the variance of the grayscales of the pixels of the grayscale image, the situation that the visibility is low can be automatically determined. In this way, the obstacle prompt mode is automatically opened to provide the driver with a clear information of the obstacles, such as vehicles or pedestrians; In addition, when it is judged that the visibility is high, the obstacle prompt mode is not open, so as to avoid unnecessary interference to the driver's visual.

Figure 3B:
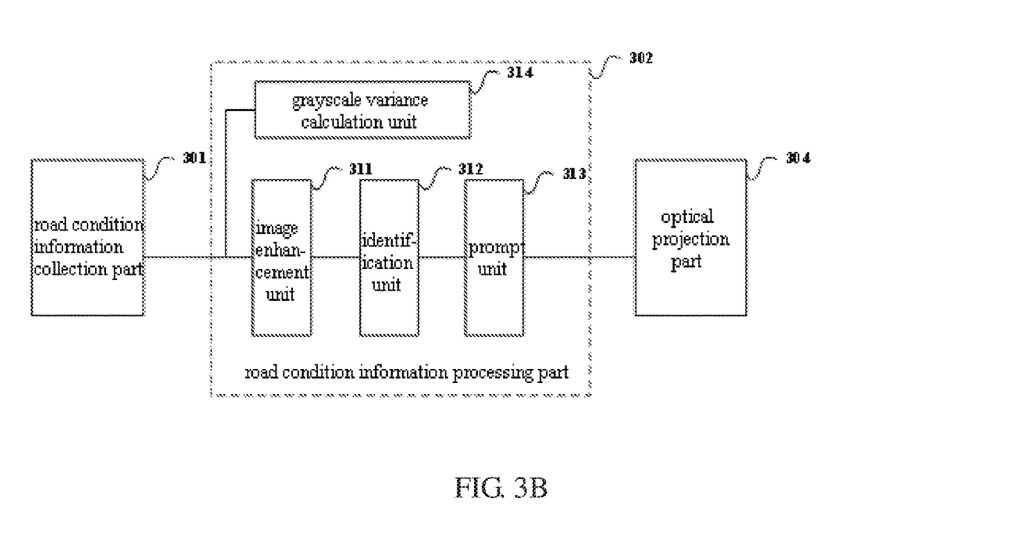
FIG. 3B is a block diagram illustrating an internal structure of an automobile head up display system according to another example of another embodiment of the present disclosure.

Another example of another embodiment of the present disclosure provides an automobile head up display system, and FIG. 3B is a schematic block diagram of the automobile head up display system provided by the present embodiment. As shown in FIG. 3B, the automobile head up display system includes a road condition information collection part 301, a road condition information processing part 302, and an optical projection part 304. The difference from the example shown in FIG. 3A is that, in the present example, the road condition information processing part 302 frames the obstacles with the identification frames in the enhancement processed image, and then signals of the identification frames are transmitted to the optical projection part 304 connected thereto. The optical projection part 304 projects the identification frames to the front windshield as the prompt boxes for prompting information. In the present example, the process in which the light source display part shown in FIG. 3A is used as a light source to propagate the image to the optical projection part is omitted.

Figure 4:
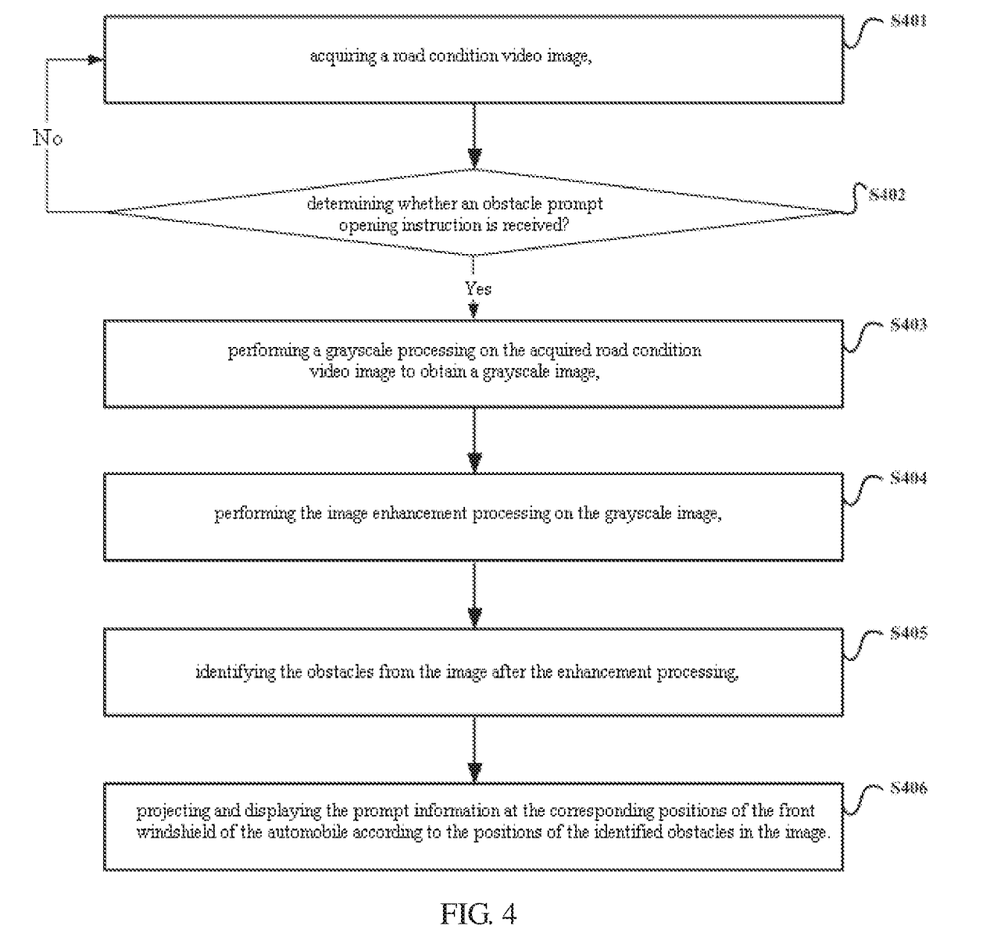
FIG. 4 is a flow chart of an obstacle prompt method of an automobile head up display system according to another embodiment of the present disclosure.

A specific process of an obstacle prompt method of an automobile head up display system provided by another embodiment of the present disclosure shown in FIG. 4 includes the following steps.

Step S401: acquiring a road condition video image.

For example, the automobile head up display system acquires the road condition video image of the current road condition in real time by the camera. For example, a shooting angle of the camera is the same as a direction of view of the automobile driver, and the heights are the same, so that the road condition video image captured by the camera is similar to the image view visually observed by the driver through the front windshield. Then the acquired image can be specifically enhancement processed according to the following steps S402-S404.

Step S402: determining whether an obstacle prompt opening instruction is received.

If yes, opening the obstacle prompt mode to perform the following step S403; otherwise, the obstacle prompt mode is not open.

Step S403: performing a grayscale processing on the acquired road condition video image to obtain a grayscale image.

For example, the method of performing the grayscale processing is the same as the step S102 described above, and details are not repeated herein again.

Step S404: performing the image enhancement processing on the grayscale image.

For example, the method of performing the grayscale processing is the same as the step S104 described above, and details are not repeated herein again.

Step S405: identifying the obstacles from the image after the enhancement processing.

For example, the method of identifying the obstacles is the same as the step S405 described above, and details are not repeated herein again.

Step S406, projecting and displaying the prompt information at the corresponding positions of the front windshield of the automobile according to the positions of the identified obstacles in the image.

For example, according to the positions of the identified obstacles in the image, the prompt information is projected and displayed at the corresponding positions of the front windshield of the automobile by the automobile head up display system. For example, according to the positions of the identified obstacles in the image, the automobile head up display system frames the obstacles with the identification frames in the enhancement processed image; and then the position and size information of the identification frames in the coordinate system of the image is converted into the corresponding position and size information in the coordinate system of the display screen of the automobile head up display system; The automobile head up display system draws the prompt boxes as the prompt information in the display picture according to the converted position and size information, displays the display picture though the display screen, and projects and displays the display picture on the front windshield of the automobile by optical refraction projection.

Figure 5:
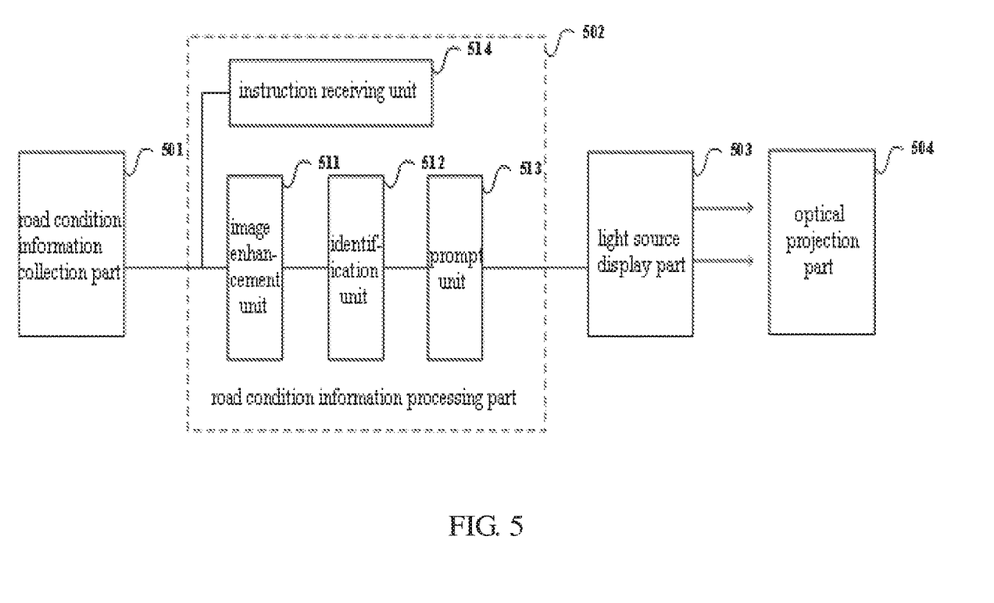
FIG. 5 is a block diagram illustrating an internal structure of an automobile head up display system according to another embodiment of the present disclosure.

Another embodiment of the present disclosure provides an automobile head up display system, the internal structure of which is shown in FIG. 5, including a road condition information collection part 501, a road condition information processing part 502, a light source display part 503, and an optical projection part 504.

The road condition information processing part 501 is configured to acquire a road condition video image. For example, the road condition information collection part 501 can capture the road condition video image by a camera. For example, a shooting angle of the camera is the same as an angle of view of the automobile driver, and heights are the same.

The road condition information processing part 502 is configured to perform the enhancement processing on the road condition video image acquired by the road condition information collection part 501, and identify the obstacles therefrom. According to positions of the identified obstacles in the road condition video image, the light source display part 503 and the optical projection part 504 projects and displays prompt information at the corresponding positions of the front windshield of the automobile.

For example, the road condition information processing part 502 performs the enhancement processing on the road condition video image acquired by the road condition information collection part 501, and identifies the obstacles therefrom; and then, according to the positions of the identified obstacles in the image, the obstacles are framed with the identification frames in the enhancement processed image; the position and size information of the identification frames in the coordinate system of the image is converted into the corresponding position and size information in the coordinate system of the display screen of the automobile head up display system; the prompt boxes as the prompt information are drawn on the display screen according to the converted position and size information, and a display picture is transmitted to the light source display part 503; after displayed by the light source display part 503 on the display screen, the display picture is projected and displayed on the front windshield of the automobile by the optical refraction of the optical projection portion 504.

The light source display part 503 can include an LCD or an LED display screen, and a related driving circuit, and displayed contents thereof can further include driving information of the vehicle, such as a vehicle speed, an oil amount, and the like. In order to achieve a better virtual and realistic fusion effect, a size of a display region of the display screen can be proportional to a size of a region of road condition scene that the driver obtains through the eyes.

The optical projection part 504 can include a spherical mirror and a cylindrical mirror. The optical projection part 504 is mainly configured to transmit the display contents on the display screen of the light source display part to the front windshield by refraction; and then the display contents are transmitted to the eyes of the driver by reflection of the front windshield to complete the fusion of the virtual scene and the real scene. The size and center position of the reflection region of the front windshield can be adjusted to a position coincident with the field of view of the eyes of the driver by adjusting a position and an angle of the mirror, adjusting an angle of reflection of the light source, and adjusting a magnification factor of the light source in an initial stage.

For example, the road condition information processing part 502 can include the following units: an image enhancement unit 511, an identification unit 512, and a prompt unit 513.

The image enhancement unit 511 is configured to perform enhancement processing on the image acquired by the road condition information collection part. The method of performing the enhancement processing by the image enhancement unit 511 can refer to the step S404 described above, and details are not repeated herein again.

The identification unit 512 is configured to identify obstacles from the image enhanced by the image enhancement unit 511. The specific method of identifying the obstacles by the identification unit 512 can refer to the step S405 described above, and details are not repeated herein again.

The prompt unit 513 is configured to project and display the prompt information at the corresponding positions of the front windshield of the automobile by the light source display part 503 and the optical projection part according to the positions of the obstacles identified by the identification unit 512 in the image. For example, the prompt unit 513 frames the obstacles with the identification frames in the image after the enhancement processing according to the positions of the obstacles in the image; the position and size information of the identification frames in the coordinate system of the image is converted into the corresponding position and size information in the coordinate system of the display screen of the automobile head up display system; the prompt boxes as the prompt information are drawn on the display screen according to the converted position and size information, and a display picture is transmitted to the light source display part 503; after displayed by the light source display part 503 on the display screen, the display picture is projected and displayed on the front windshield of the automobile by the optical refraction of the optical projection portion.

Further, the road condition information processing part 502 can further include an instruction receiving unit 514.

The instruction receiving unit 514 is configured to transmit the image enhanced indication information to the image enhancement unit 511 after receiving an instruction of opening the obstacle prompt mode input by the driver.

Accordingly, the image enhancement unit 511 is specifically configured to perform enhancement processing on the image acquired by the road condition information collection part after receiving the image enhancement indication information.

In the technical scheme of the second embodiment of the present disclosure, after acquiring the road condition video image by the camera of the automobile head up display system, the enhancement processing is performed on the acquired image to identify the obstacles from the acquired image; according to the positions of the identified obstacles in the image, the prompt information is projected and displayed at the corresponding positions of the front windshield of the automobile. In a weather of low visibility, such as haze weather, the edges of obstacles, such as vehicles or pedestrians, in the road condition video image are blurred, and the resolution is low, and if the obstacles are directly identified, the identification accuracy cannot be guaranteed. However, in the technical scheme of the present disclosure, after the image enhancement processing is performed on the video image, the outlines of the obstacles, such as vehicles or pedestrians, are much clear, and contrast between the above obstacles and surroundings is stronger. On this basis, the identification accuracy of the obstacles, such as vehicles or pedestrians, will be greatly increased. Projecting and displaying the prompt information at the corresponding positions of the front windshield, such as projecting and displaying the prompt boxes, when the visibility is low, the driver can be better provided with clear information of the obstacles, such as vehicles or pedestrians. In this way, the driver's recognition of the actual road condition in the haze weather is increased and the driving safety is improved.

Another example of the embodiment of the present disclosure provides an automobile head up display system including a road condition information collection part, a road condition information processing part and an optical projection part. The difference from the example shown in FIG. 5 is that, in the present example, the road condition information processing part frames obstacles with the identification frames in the enhancement processed image, and then signals of the identification frames are transmitted to the optical projection part connected thereto. The optical projection part projects the identification frames to the front windshield as prompt boxes for prompting information. In the present example, the process in which the light source display part shown in FIG. 5 is used as a light source to propagate the image to the optical projection part is omitted.

Further, in the embodiment of the present disclosure, by calculating the variance of the grayscales of the pixels of the grayscale image, the situation that the visibility is low can be automatically determined. The obstacle prompt mode is only open after receiving the instruction of opening the obstacle prompt by the driver, which provides the driver with clear information of the obstacles, such as vehicles, or pedestrians; however, the obstacle prompt mode is not open without receiving the instruction of opening the obstacle prompt, so as to avoid unnecessary interference to the driver's visual.

Those skilled in the art can understand that steps, measures and schemes of the various operations, methods and processes in the present disclosure may be alternated, modified, combined, or omitted. Further, other steps, measures and schemes having the various operations, methods and processes that have been discussed in this disclosure may be alternated, modified, rearranged, decomposed, combined, or omitted. Further, steps, measures and schemes in the prior art having the various operations, methods and processes that have been discussed in this disclosure may be alternated, modified, rearranged, decomposed, combined, or omitted.

It is to be understood by one of ordinary skill in the art that the discussion of any of the above embodiments is merely exemplary, and is not intended to imply that the scope of the disclosure (including the claims) is limited to the examples; In the concept of the present disclosure, the technical features in the above embodiments or different embodiments may be combined, and the steps may be implemented in any order, and there are many other variations of the various aspects of the present disclosure as described above, which are not provided in detail for the sake of brevity. Therefore, any omissions, modifications, equivalents, improvements, etc., which are made within the spirit and scope of the present disclosure, should be fall within the scope of the present disclosure.

The following points should be noted:

(1) Unless otherwise defined, the same reference numerals are used to represent the same meaning in the embodiments and accompanying drawings of the present disclosure.

(2) The accompanying drawings of the embodiments of the present disclosure involve only the structures in connection with the embodiments of the present disclosure, and other structures can be referred to a common design.

(3) For the purpose of clarity only, in the accompanying drawings configured to illustrate the embodiment(s) of the present disclosure, a layer or a region may be enlarged. However, it is to be understood that when a component or element, such as a layer, film, area, substrate or the like, is described to be "on" or "under" another component or element, it may be directly on or under the another component or element, or a component or an element is interposed therebetween.

The above are only the specific embodiments of the present disclosure, but the scope of the present disclosure is not limited thereto. Any person skilled in the art can easily conceive changes or substitutions within the technical scope of the disclosure, which shall be fall within the scope of the present disclosure. Therefore, the scope of the present disclosure shall be determined by the scope of the claims.

What is claimed is:

1. An obstacle prompt method of an automobile head up display system, comprising:
   acquiring a road condition video image;
   identifying obstacles from the acquired image after performing an enhancement processing on the acquired image; and
   projecting and displaying a prompt information at corresponding positions of a front windshield of the automobile according to positions of the identified obstacles in the road condition video image;
   wherein the identifying the obstacles comprise:
      using a convolutional neural network algorithm on the enhancement processed image to identify the obstacles including vehicles or pedestrians from the enhancement processed image;

selecting a plurality of positive samples of various angles of the vehicles and pedestrians or other obstacles from the Internet and a plurality of fuzzy negative samples of other obstacles without vehicles or pedestrians,
training and verifying the convolutional neural network,
obtaining a classifier for the various obstacle, and
identifying the corresponding obstacles from the enhancement processed image by a classifier;
wherein the enhancement processing on the acquired road condition video image comprises:
performing a grayscale processing on the acquired road condition video image to obtain a grayscale image, and calculating a variance of grayscales of pixels of the grayscale image; and
performing the image enhancement processing on the grayscale image if the variance is less than a given threshold.

2. The method according to claim 1, wherein the performing the enhancement processing on the acquired image comprises: after receiving an instruction of opening an obstacle prompt mode, performing the grayscale processing on the acquired road condition video image to obtain the grayscale image, then performing the enhancement processing on the grayscale image.

3. The method according to claim 2, wherein the performing the image enhancement processing on the gray scale image comprises: performing the image enhancement processing using a histogram equalization method with sub-blocks partially overlapped.

4. The method according to claim 3, wherein the identifying the obstacles comprise: using a convolutional neural network algorithm on the enhancement processed image to identify the obstacles from the enhancement processed image.

5. The method according to claim 1, wherein the projecting and displaying the prompt information at the corresponding positions of the front windshield of the automobile according to the positions of the identified obstacles in the road condition video image comprises:
framing the obstacles with identification frames in the enhancement processed image;
converting position and size information of the identification frames in a coordinate system of the enhancement processed image into the corresponding position and size information in a coordinate system of a display screen of the automobile head up display system;
displaying prompt boxes as the prompt information on the display screen according to the converted position and size information; and
projecting and displaying a display picture displayed by the display screen on the front windshield of the automobile by optical refraction.

6. The method according to claim 1, wherein the projecting and displaying the prompt information at the corresponding positions of the front windshield of the automobile according to the positions of the identified obstacles in the road condition video image comprises:
framing the obstacles with the identification frames in the enhancement processed image;
projecting the identification frames on the front windshield as prompt boxes for the prompt information.

7. The method according to claim 1, wherein the obstacles comprise at least one of vehicles and pedestrians.

8. The method according to claim 1, wherein the performing the image enhancement processing on the grayscale image comprises: performing the image enhancement processing using a histogram equalization method with sub-blocks partially overlapped.

9. An automobile head up display system, comprising:
a road condition information collection part configured to acquire a road condition video image;
a road condition information processing part connected with the road condition information collection part;
an optical projection part,
wherein the road condition information processing part is configured to perform an enhancement processing on the road condition video image acquired by the road condition information collection part and identify obstacles therefrom; and to project and display a prompt information at corresponding positions of a front windshield of the automobile by the optical projection part according to positions of the identified obstacles in the road condition video image,
wherein the road condition information processing part comprises: an image enhancement unit configured to perform the enhancement processing on the road condition video image acquired by the road condition information collection part;
an identification unit connected with the image enhancement unit, and configured to identify the obstacles including vehicles or pedestrians from the enhancement processed image by using a convolutional neural network algorithm on the enhancement processed image, selecting a plurality of positive samples of various angles of the vehicles and pedestrians or other obstacles from the Internet and a plurality of fuzzy negative samples of other obstacles without vehicles or pedestrians, training and verifying the convolutional neural network, obtaining a classifier for the various obstacle, and identifying the corresponding obstacles from the enhancement processed image by the classifier;
the road condition information processing part further comprises:
a grayscale variance calculation unit connected with the road condition information collection part, and configured to calculate a variance of grayscales of pixels for the acquired road condition video image; and
after determining that the variance is less than a given threshold, transmitting an image enhancement indication information to the image enhancement unit.

10. The system according to claim 9, wherein the optical projection part is connected with the road condition information processing part, and is configured to project the prompt information corresponding to the enhancement processed image on the front windshield.

11. The system according to claim 10, wherein the road condition information processing part comprises:
an image enhancement unit configured to perform the enhancement processing on the road condition video image acquired by the road condition information collection part;
an identification unit connected with the image enhancement unit, and configured to identify the obstacles from the enhancement processed image; and
a prompt unit connected with the identification unit, and configured to project and display the prompt information at the corresponding positions of the front windshield of the automobile according to the positions of the identified obstacles in the road condition video image through the optical projection part.

12. The system according to claim 9, further comprising:
a light source display part connected with the road condition information processing part,
wherein the light source display part is configured to display the enhancement processed image, and to project the prompt information corresponding to the image on the front windshield through the optical projection part.

13. The system according to claim 12, wherein the road condition information processing part comprises:
an image enhancement unit configured to perform the enhancement processing on the road condition video image acquired by the road condition information collection part;
an identification unit connected with the image enhancement unit, and configured to identify the obstacles from the enhancement processed image; and
a prompt unit connected with the identification unit, and configured to project and display the prompt information at the corresponding positions of the front windshield of the automobile according to the positions of the identified obstacles in the road condition video image through the optical projection part.

14. The system according to claim 13, wherein the road condition information processing part further comprises:
a grayscale variance calculation unit connected with the road condition information collection part and the image enhancement part, and configured to calculate a variance of grayscales of pixels for the acquired road condition video image; and
after determining that the variance is less than a given threshold, transmitting an image enhancement indication information to the image enhancement unit;
wherein the image enhancement unit is configured to perform the enhancement processing on the road condition video image acquired by the road condition information collection part according to the received image enhancement indication information.

15. The system according to claim 14, wherein the road condition information processing part further comprises:
an instruction receiving unit connected with the image enhancement unit, and configured to transmit the image enhanced indication information to the image enhancement unit after receiving an instruction of opening the obstacle prompt mode,
wherein the image enhancement unit is configured to perform the enhancement processing on the image acquired by the road condition information collection part according to the received image enhancement indication information.

16. The system according to claim 9, wherein the road condition information processing part further comprises:
a prompt unit connected with the identification unit, and configured to project and display the prompt information at the corresponding positions of the front windshield of the automobile according to the positions of the identified obstacles in the road condition video image through the optical projection part.

17. The system according to claim 16, wherein the road condition information processing part further comprises:
an instruction receiving unit connected with the image enhancement unit, and configured to transmit the image enhanced indication information to the image enhancement unit after receiving an instruction of opening the obstacle prompt mode,
wherein the image enhancement unit is configured to perform the enhancement processing on the image acquired by the road condition information collection part according to the received image enhancement indication information.

* * * * *